United States Patent [19]
Schmed

[11] Patent Number: 6,019,028
[45] Date of Patent: *Feb. 1, 2000

[54] APPARATUS FOR PREPARING FILTER COFFEE

[76] Inventor: Arthur Schmed, Langrütistrasse 87, CH-8635 Oberdürnten, Switzerland

[ * ] Notice: This patent is subject to a terminal disclaimer.

[21] Appl. No.: 09/150,779

[22] Filed: Sep. 10, 1998

[30] Foreign Application Priority Data

Sep. 11, 1997 [CH] Switzerland ............... 2140/97

[51] Int. Cl.[7] ................................ A47J 31/54
[52] U.S. Cl. ................ 99/293; 99/290; 99/304
[58] Field of Search .............. 99/293, 290, 304, 99/294, 307; 426/433

[56] References Cited

U.S. PATENT DOCUMENTS 1,751,477  3/1930  Greenwald ............... 99/293 X
4,137,833  2/1979  Yelloz ...................... 99/293
5,154,110  10/1992  Chang ................... 99/293 X

FOREIGN PATENT DOCUMENTS 3537063    4/1987  Germany.
195451111  6/1997  Germany.

*Primary Examiner*—Reginald L. Alexander
*Attorney, Agent, or Firm*—Tarolli, Sundheim, Covell, Tummino & Szabo L.L.P.

[57] ABSTRACT

In an apparatus for preparing filter coffee, there is provided an autonomous assembly for generating steam, besides an assembly for generating hot water required for brewing the coffee powder. An essential element of that steam generating assembly is a separate container to be filled with fresh water, having an outlet that is connected to a heating element.

11 Claims, 2 Drawing Sheets

APPARATUS FOR PREPARING FILTER COFFEE

FIELD OF THE INVENTION

The present invention refers to an apparatus for preparing filter coffee, comprising an assembly for generating hot water required for brewing a coffee beverage and an assembly for generating steam.

In the present context, an apparatus for preparing filter coffee or a "filter coffee machine" shall describe an apparatus in which the brewing water flows without pressure, under the influence of gravity, through the coffee powder received in a coffee filter, usually a paper filter. Such filter coffee machines comprise a heating element operating as a constant flow water heater both for heating up and feeding the water. A feeding pump is not required since the water expands during heating according to thermodynamic laws and flows in bursts through a rising pipe to an outlet, from where it can flow through the coffee powder under the influence of gravity. Desirable in that kind of filter coffee machines is an additional steam outlet for heating an other beverage, for example cold milk.

PRIOR ART

The German Publication DE-195 45 11 discloses an apparatus for preparing brewed beverages, in the form of a coffee machine, which comprises an assembly for generating steam. The steam generating assembly is provided with an electrically heated water heater designed as a constant flow water heater and producing a mixture of water and steam. The constant flow water heater is connected to a steam separator by means of which the steam can be separated from the water-steam mixture. The separated steam is led via a steam conduit directly to a foaming nozzle, while the water separated from the steam-water mixture flows back through an outlet pipe into the connecting pipe leading from the water supply container to the constant flow water heater. The disadvantage of such a design of an apparatus for preparing brewed beverages may be seen in the fact that steam can be generated only if the water supply container is filled with water. However, if a filter coffee beverage has been prepared with the help of the filter coffee machine in a preceding step, the water supply container usually is empty as, caused by the principle of operation, all water contained in the water supply container as well as the water separated in the steam separator is consumed during the brewing operation. The result is that water has to be filled into the water supply container after a coffee preparing cycle in order to be in a position to generate steam.

The German Publication DE-35 37 063 discloses another filter coffee machine, designated as an electrically operated beverage heater, that is provided with an assembly for generating steam. Thereby, the assembly for generating steam includes a steam separator whose water outlet is connected to the fresh water conduit running from the water supply container to the constant flow water heater. Thus, the water separated in the steam separator flows back into the fresh water conduit. Again, also in that embodiment of a filter coffee machine, it is necessary to refill the water supply container after a preceding coffee preparing cycle before steam can be generated.

Another disadvantage of such filter coffee machines known in the prior art is that the assembly for generating steam also represents a compromise since one and the same assembly is used both for generating hot brewing water and for generating steam.

OBJECT OF THE INVENTION

Thus, it is the object of the present invention to improve a filter coffee machine of the kind referred to above in such a way that steam can be generated at any desired time, particularly independently of the level of the water in the water supply container.

SUMMARY OF THE INVENTION

To meet this and other objects, the present invention provides an apparatus for preparing filter coffee, comprising a first fresh water container, means for generating hot water adapted for brewing a coffee beverage, and means for generating steam. Thereby, the means for generating steam comprises a second fresh water container adapted to be filled with fresh water.

In other words, the basic idea behind the invention is to provide, besides the usual fresh water container required for preparing filter coffee, a second fresh water container from which the water is taken that is required for generating steam.

According to a preferred embodiment of the apparatus of the invention, the means for generating steam are independent of the means for generating hot water, whereby the water required for generating steam is fed to the steam generating means from the second fresh water container, and whereby the means for generating steam is designed as a closed loop steam generating system. By that design, the steam generating means can be optimally adapted to fulfill the required task.

According to a further embodiment of the apparatus according to the invention, the second fresh water container is adapted to simultaneously operate as a steam separator.

Finally, according to a still further embodiment of the apparatus according to the present invention, it is proposed that the second water container simultaneously designed as a steam separator is provided with means for ensuring that an overpressure is present in the interior of the second fresh water container during the generation of steam. This overpressure favors a uniform supply of steam.

BRIEF DESCRIPTION OF THE DRAWINGS

In the following, an embodiment of the apparatus according to the present invention will be further described, with reference to the accompanying drawings, in which.

DETAILED DESCRIPTION OF A PREFERRED EMBODIMENT

Figure 1:
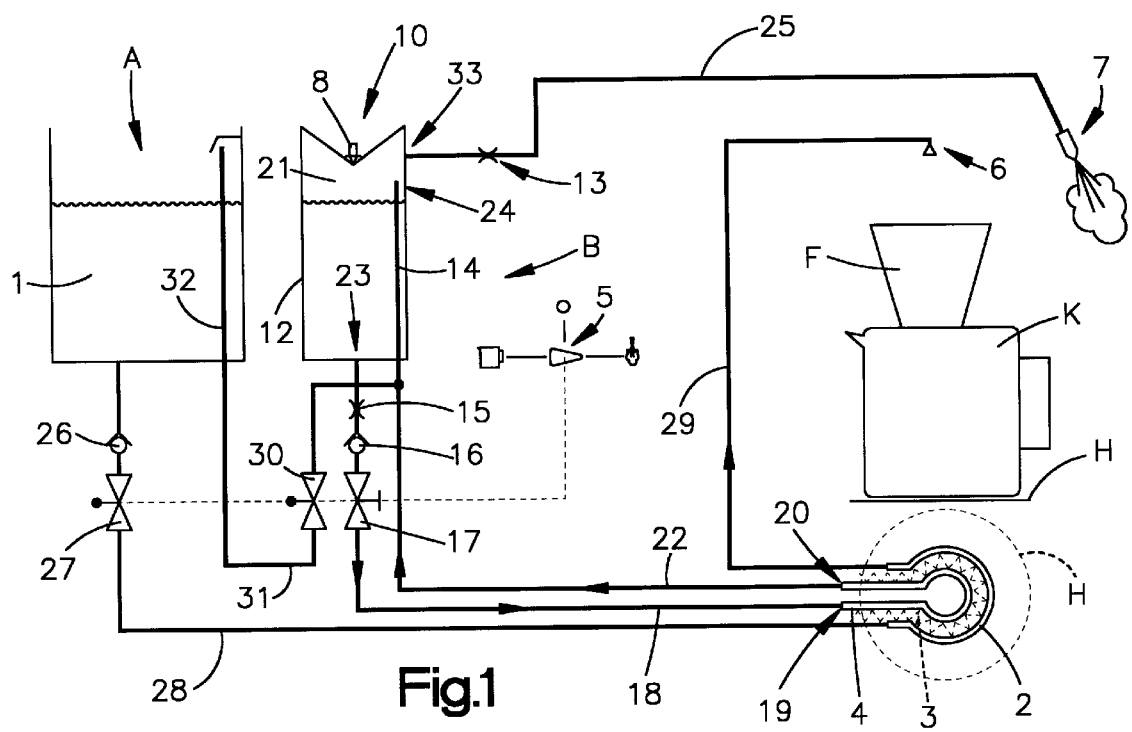
FIG. 1 shows a schematic sketch of the general layout of an apparatus for preparing filter coffee incorporating a steam generator assembly, in a first phase of operation.

In the following, with the help of FIG. 1, the general layout of an apparatus for preparing filter coffee incorporating a steam generator assembly shall be further explained, in fact in a first phase of operation, i.e. in a phase of operation in which the apparatus of the invention is used to generate steam.

Similar to the filter coffee machines known in the prior art, the apparatus according to the invention also comprises an assembly A for generating brewing water. That assembly A essentially comprises a tank 1 for fresh water, a heating element 2 provided with an electric heating coil, a pipe section 3 running along the heating element 2, a selector switch 5, as well as an outlet 6 for hot water. Moreover, there is provided a cold water piping 28, a brewing water piping 29, a non-return valve 26 inserted into the cold water piping 28, as well as a closure member 27.

Besides the assembly A for generating brewing water, there is provided a separate assembly B for generating steam. The assembly B for generating steam essentially comprises a second pipe section 4 also running along the heating element 2, a water supply tank 10 as well as a steam outlet 7. The water supply tank 10 is designed simultaneously as a steam separator, in as much as the outlet 20 of the second pipe section 4 opens into the water supply tank 10 via a piping 22. In the steam outlet pipe 33 of the water supply tank 10, a cross section reduction member 13 is located which ensures that a certain overpressure can be built up in the interior of the water supply tank 10.

In order to enable the water supply tank 10 to be filled with fresh water, the top of the tank 10 is provided with a filler aperture 8. Provided in the interior of the water supply tank 10 is a rising pipe 14 having an outlet end 24 that is located above the top water level in the tank 10. In the region of the water outlet 23 of the water supply tank 10, a constriction 15, a non-return valve 16 and a closure member 17 are located, the latter one being operatively coupled with a selector switch 5. The water outlet 23 of the water supply tank 10 is connected to the inlet end 19 of the second pipe section 4 via a pipe 18. In the design as described herein before, in which the assembly B for generating steam comprises a closed loop circuit, the water required for generating steam is fed directly from the water supply tank 10. Thus, steam can be generated even after brewing coffee without the need to first refill the fresh water tank 1. Thereby, in the water supply tank 10, the water particles entrained by the steam are removed with the result that dry steam escapes from the steam outlet 7.

For clarity's sake, the heating element 2 as well as the two pipe sections 3 and 4 running along the heating element 2 are shown in a top view, while the remaining elements of the apparatus are shown in a strictly schematic side view.

A rising pipe 32 provided in the interior of the fresh water tank 1 is connected to the steam pipe 22 by means of a further piping 31 whereby that piping 31 is provided with a further non-return valve 30. The purpose of providing such a piping 31 is that a possible overpressure in the steam pipe 22 and in the water supply tank 10 can be reduced, if appropriate.

For receiving the coffee powder to be brewed, there is provided a filter funnel F, and for collecting the coffee beverage, a coffee pot K is provided. Above the heating element 2, a heating plate member H is located; in the drawings, it is shown in a side view below the coffee pot K as well as, additionally, in a schematic top view in broken lines. The connecting pipes 18, 22, 28 and 29 located in the interior of the apparatus are schematically shown as simple lines, but are preferably constituted, in reality, by flexible pipe members.

As the fundamental mode of operation of such filter coffee machines is well known to any person skilled in the art, in the following, only those elements and their mode of operation is further explained that are essential in connection with the present invention.

If the selector switch is in its right position marked "steam", as shown in FIG. 1, water flows from the water supply tank 10 via the non-return valve 16, the open closure member 17 and the connecting pipe 18 into the aforementioned second pipe section 4 where it is evaporated. The so generated steam is led by the connecting pipe 22 to the water supply tank 10 where entrained water particles are separated. The dry steam flows through the steam outlet 33 of the water supply tank 10 and through the further connecting pipe 25 to the steam outlet nozzle 7 from which it finally escapes. In order to ensure that a certain overpressure can be built up in the interior of the water supply tank 10, and in order to avoid that the steam can escape from the interior of the water supply tank 10 through the fresh water inlet 8, a valve member 21 is provided. The valve member 21 simultaneously serves as a pop valve 21 that opens due to safety reasons as soon as a certain predetermined pressure in the interior of the water supply tank 10 is exceeded.

By the provision of the restriction 15 in the region of the water outlet of the water supply tank 10, the amount of water led to the second pipe section 4 is limited to such a value that the heating power of the heating element 2 is sufficient to essentially completely evaporate the water fed thereto per unit of time. Due to the measure that the closure member 27 provided at the outlet of the fresh water tank 1 is closed in the mode of operation described herein before, no water flows through the first pipe section 3, with the result that essentially the entire heating power of the heating element 2 is available for evaporating the water flowing into the second pipe section 4.

The design of the water supply tank 10 as herein before described ensures that an overpressure is built up in the interior of the water supply tank 10 due to the evaporation of water. This overpressure causes the water to continuously flow from the water supply tank 10 via the pipe 18 into the second pipe section 4, with the result that a continuous generation of steam is ensured.

Figure 2:
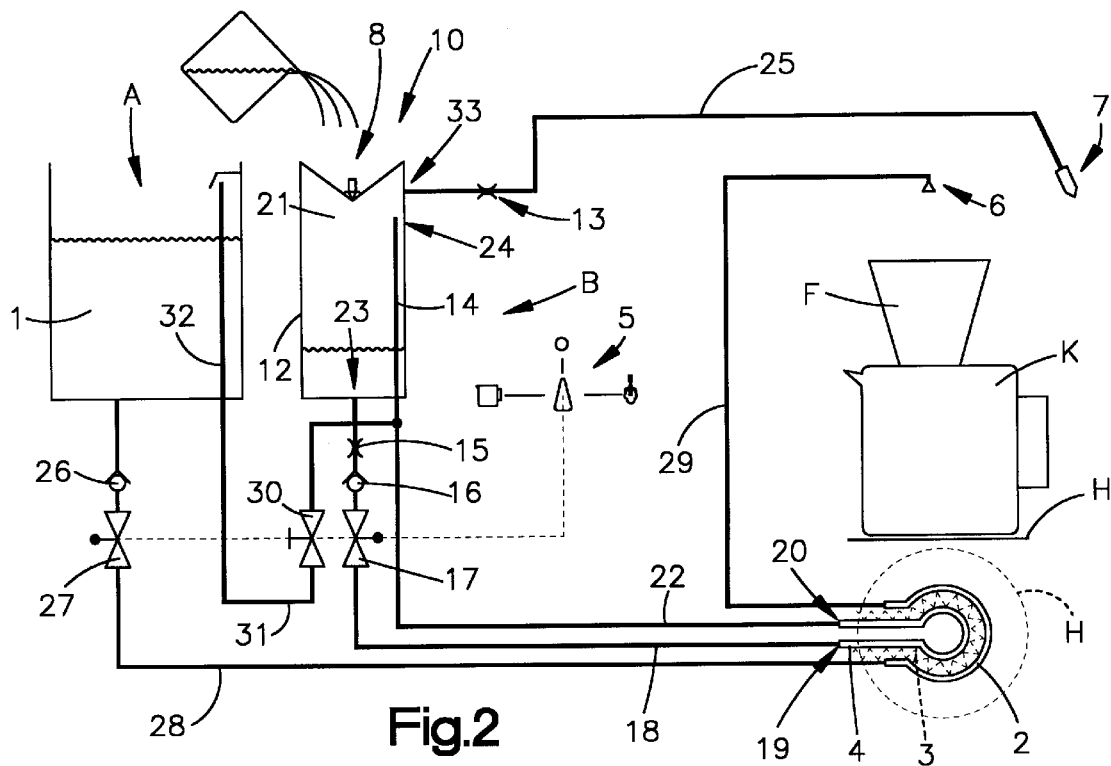
FIG. 2 shows the apparatus according to FIG. 1, in a second phase of operation.

FIG. 2 shows the filter coffee machine in the mode of operation "0". In that mode of operation, a possible overpressure in the interior of the water supply tank 10 can be reduced. Upon switching the selector switch 5 from the position "steam" to the position "0", the closure member 30 is opened. The result is that the overpressure present in the steam pipe 22 and in the interior of the water supply tank 10 can escape through the piping 31 and the rising pipe 32 into the fresh water tank 1. By opening the closure member 30, it is moreover ensured that any escaping of steam out of the steam nozzle 7 is instantly stopped such that any danger of possible burns is avoided. As soon as the overpressure in the interior of the water supply tank 10 is reduced to zero, the tank 10 can be refilled or topped with fresh water, as is schematically shown in FIG. 2 by the pot 35 filled with water. In order to fill the tank 10, the valve member 21 has to be manually lifted by a certain amount.

In order to avoid that the water supply tank 10 has not to be filled separately with fresh water, an alternative embodiment could be seen in a design in which the water supply tank 10 is connected by a connecting pipe (not shown in the drawings) to the fresh water tank 1, such that the water supply tank 10 is also filled with fresh water upon filling the fresh water tank 1. Moreover, in order to avoid that flows back from the water supply tank 10 to the fresh water tank 1 upon brewing coffee, such a connecting pipe had to be provided with a check valve member (not shown in the drawings).

Figure 3:
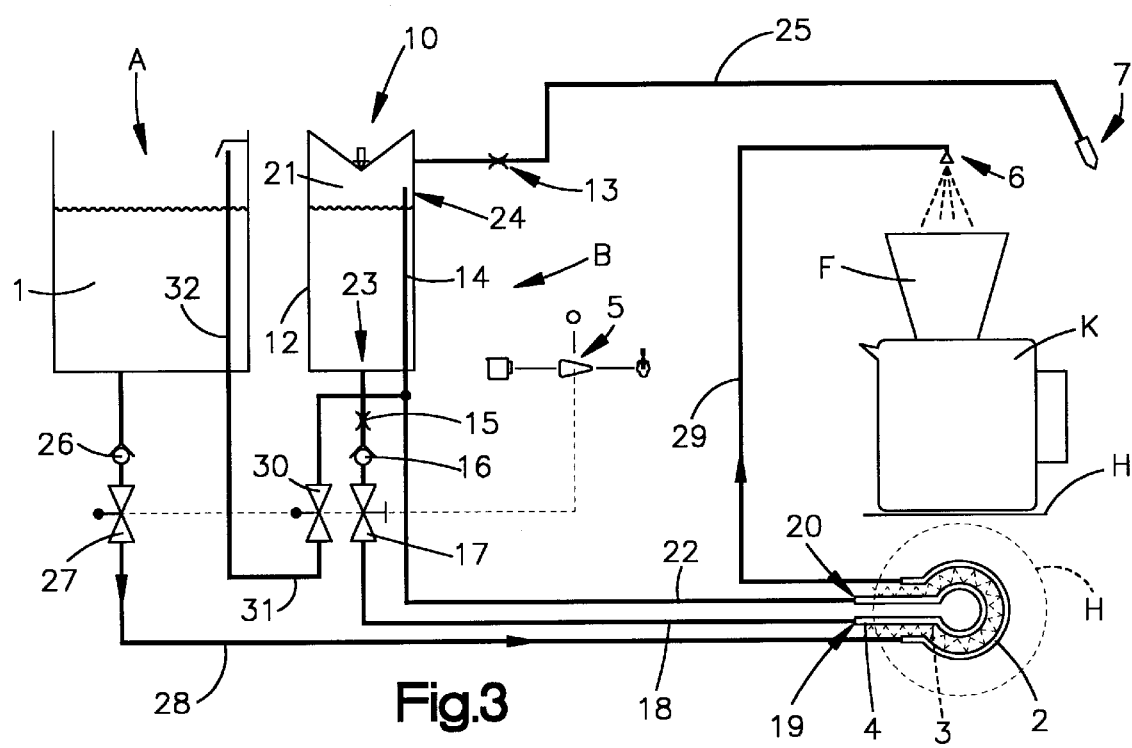
FIG. 3 shows the apparatus according to FIG. 1, in a third phase of operation.

FIG. 3 shows the coffee machine in a third mode of operation during brewing of coffee. Upon switching the selector switch 5 into the left position, the closure member 27 at the outlet of the fresh water tank 1 is opened, while the closure member 17 at the outlet 23 of the water supply tank 10 is closed. Thus, fresh water flows through the piping 28 into the first pipe section 3 where it is heated. The heated water flows through the rising pipe 29 to the hot water outlet 6 from where it flows into the filter funnel member F, brews the coffee powder received therein, and finally flows as coffee beverage into the pot K. A pump for feeding the water is not required in such a coffee machine, because the water expands upon heating according to the well known thermodynamic principles, and flows in bursts through the rising pipe 29 to the outlet 7 while the valve member 26 alternatingly opens and closes. Since the mode of operation of such coffee machines is well know, it is not necessary to provide more detailed explanations here.

In order to ensure a good heat transfer between the heating element 2 and the two pipe sections 3, 4, the heating element 2 is provided with a jacket, preferably made of aluminum, that is welded to the two pipe sections 3, 4, preferably made of aluminum

What is claimed is:

1. An apparatus for preparing coffee, comprising:

a first fresh water container means;

means for generating hot water for brewing a coffee beverage; and means for generating steam;

said means for generating steam comprising a second fresh water container means adapted to be filled with fresh water, said means for generating steam being independent of said means for generating hot water, and wherein said means for generating steam further includes a closed loop steam generator means, said means for generating steam from water includes means for directing water to the closed loop steam generator means from said second fresh water container means.

2. An apparatus according to claim 1 in which said second fresh water container means simultaneously operates as a steam separator means.

3. An apparatus according to claims 2 in which said second fresh water container means comprises a steam outlet means, whereby said means for generating steam comprises means for ensuring that an overpressure is present in the interior of said second fresh water container means during the generation of steam from water.

4. An apparatus according to claim 3 in which said means for ensuring that an overpressure is present in the interior of said second fresh water container means comprises a restriction means located at said steam outlet means of said second fresh water container means or in a conduit means leading to a steam nozzle means.

5. An apparatus according to claim 2 in which the outlet of said second pipe section is connected to said second fresh water container means via a first piping means and a rising pipe means, whereby the outlet of said rising pipe means is located above the top water level of said second fresh water container means.

6. An apparatus for preparing coffee, comprising:

a first fresh water container means;

means for generating hot water for brewing a coffee beverage; and means for generating steam;

said means for generating steam comprising a second fresh water container means adapted to be filled with fresh water, further comprising a heating element means including a central heating coil means as well as a first and a second pipe section, both being in thermal contact with said heating coil means, said first pipe section being provided to heat water required for brewing a coffee beverage and said second pipe section being provided for generating steam.

7. An apparatus for preparing coffee, comprising:

a first fresh water container means;

means for generating hot water for brewing a coffee beverage; and means for generating steam;

said means for generating steam comprising a second fresh water container means adapted to be filled with fresh water, said means for generating steam comprises a means for limiting the amount of water flowing per time unit from said second fresh water container means to a second pipe section.

8. An apparatus for preparing coffee, comprising:

a first fresh water container means;

means for generating hot water for brewing a coffee beverage; and means for generating steam;

said means for generating steam comprising a second fresh water container means adapted to be filled with fresh water, said second fresh water container means is provided with a filler aperture means for filling said second fresh water container means with water, whereby a first valve means is provided in the region of said filler aperture means.

9. An apparatus according to claim 8 in which said first fresh water container means directly or indirectly communicates with the interior or said second fresh water container means via a second piping means.

10. An apparatus according to claim 9 in which a second valve means is inserted into said second piping means interconnecting said first fresh water container means and said second fresh water container means, said second valve means relieves an overpressure in the interior of said second fresh water container means when it is in an opened condition.

11. An apparatus according to claim 10, further comprising selector switch means for selecting the mode of operation of the apparatus, said second valve means being operatively coupled to said selector switch means.

* * * * *